(12) United States Patent
Rogers

(10) Patent No.: US 10,427,849 B2
(45) Date of Patent: Oct. 1, 2019

(54) CABLE TIE ADAPTER

(71) Applicant: Advanced Cable Ties, Inc., Gardner, MA (US)

(72) Inventor: David J. Rogers, Belchertown, MA (US)

(73) Assignee: Advanced Cable Ties, Inc., Gardner, MA (US)

( * ) Notice: Subject to any disclaimer, the term of this patent is extended or adjusted under 35 U.S.C. 154(b) by 207 days.

(21) Appl. No.: 14/730,540

(22) Filed: Jun. 4, 2015

(65) Prior Publication Data

US 2016/0355310 A1 Dec. 8, 2016

(51) Int. Cl.
*B65D 63/10* (2006.01)

(52) U.S. Cl.
CPC .... *B65D 63/1072* (2013.01); *B65D 2563/107* (2013.01); *B65D 2563/108* (2013.01); *Y02W 30/807* (2015.05)

(58) Field of Classification Search
CPC .......... B65D 63/1072; B65D 2563/108; B65D 2563/107
See application file for complete search history.

(56) References Cited

U.S. PATENT DOCUMENTS

| | | | |
|---|---|---|---|
| 3,908,233 A | 9/1975 | Caveney et al. | |
| 3,991,444 A | 11/1976 | Bailey | |
| 4,728,064 A | 3/1988 | Caveney | |
| 5,193,250 A | 3/1993 | Caveney | |
| 5,377,388 A * | 1/1995 | DeBever | B65D 63/1072 24/16 PB |
| 5,651,376 A * | 7/1997 | Thompson | A61F 5/3723 128/878 |
| 5,802,888 A * | 9/1998 | Parsons | A61F 5/37 128/879 |
| 6,119,314 A * | 9/2000 | Freed | B65D 63/1063 24/16 PB |
| 6,185,791 B1 * | 2/2001 | Khokhar | B65D 63/1063 24/16 PB |
| 6,326,890 B1 * | 12/2001 | Costa | B65D 63/1072 340/568.1 |
| 6,477,746 B1 | 11/2002 | Axelsson | |
| 6,718,597 B2 * | 4/2004 | Geiger | B65D 63/1072 24/16 PB |
| 7,437,804 B1 * | 10/2008 | Geiger | B65D 63/1072 24/16 PB |
| 7,866,005 B2 | 1/2011 | Vermeer et al. | |
| 8,276,244 B2 | 10/2012 | Vermeer et al. | |
| 9,067,717 B2 * | 6/2015 | DeMik | B65D 67/02 |
| 9,210,969 B2 * | 12/2015 | Wheelwright | A44B 11/2592 |
| 9,643,764 B1 * | 5/2017 | Huang | B65D 63/1072 |
| 2007/0033772 A1 | 2/2007 | Brownlee et al. | |
| 2009/0172921 A1 | 7/2009 | Vermeer | |
| 2011/0072623 A1 | 3/2011 | Vermeer et al. | |

(Continued)

*Primary Examiner* — Jason W San
(74) *Attorney, Agent, or Firm* — Brian M. Dingman; Dingman IP Law, PC

(57) ABSTRACT

An adapter which allows a non-releasable cable tie to be releasable or which provides an added feature to the function of a cable tie. The cable tie may be installed within the adapter to provide a temporary use or a continually reusable purpose for the cable tie. The adapter may also include features which provide mounting, labeling, or merging of cable ties by simply installing the cable ties within embodiments of the adapter.

6 Claims, 14 Drawing Sheets

(56) References Cited

U.S. PATENT DOCUMENTS

2016/0001945 A1* 1/2016 Foreman ................. F16L 3/222
                                                    29/525.03
2017/0023155 A1* 1/2017 Lu ...................... B65D 63/1027
2017/0066577 A1* 3/2017 Williams ........... B65D 63/1072

* cited by examiner

CABLE TIE ADAPTER

FIELD OF THE INVENTION

This disclosure relates to a cable tie, and more particularly to an adapter that allows standard cable ties to be releasable, reusable, or to have added functions.

BACKGROUND

Cable ties are used by consumers and throughout industry as a means of securing cables or other objects for a variety of applications. Cable ties provide a secure grip to hold goods together in shipment, within enclosures, and for securing such things as bicycle tires upon the roof of a family vacation vehicle. Their potential uses are countless as they provide simple, yet secure attachment. Releasable cable ties have been available for many years, however single-use cable ties are still used significantly, creating unnecessary waste and inconvenience. There is a need to convert single-use cable ties to releasable ties so that they may be released easily or reused or so the cable ties may be used temporarily while designs are being finalized, at which point the permanence of the non-releasable cable tie may be preferred. Also, there is a need to provide a means of identifying the contents secured within a cable tie or a means to secure a cable tie in a particular position within its function so that the gathered materials remain stationary, if desired by a user.

SUMMARY

This disclosure relates to an adapter which may be used with existing cable ties in order to provide additional features beyond the simple securing of materials within an engaged cable tie. A cable tie is installed within the subject adapter, allowing the cable tie to be reusable or so that it may assume another function in addition to its typical function of securing materials. The adapter provides a cavity in which the head of a cable tie may be installed, and a means of securing the cable tie so that the cable tie/adapter combination is as reliable as the cable tie itself. The adapter provides a reliable attachment by securing a cable tie within the adapter by installing the cable tie head in a specific holding configuration while maintaining its holding configuration with a securing mechanism. The securing mechanism may be one of multiple possibilities such as brackets which hold the cable tie strap immediately adjacent and connected to the cable tie head within the cavity, therefore maintaining the integrity of the head's position within the cavity, while also offering a simple means of releasing the head from the adapter cavity. Securing mechanisms could also be ridges or clips or fasteners within the body of the adapter which would releasably embrace the head of the installed cable tie, providing at least the same strength and reliability of the cable tie, as manufactured, while also providing added features and/or reusability the adapter has to offer. An installed cable tie may be easily removed from the adapter by simply reversing the installation procedure. Also, the adapter may be produced in a variety of sizes in order to equip the variety of cable ties available in commerce, such as tensile strengths 18, 30, 40, 50, 75, 100, 120, 150, 175, and 250 lbs.

Embodiments may include one of the following features, or any combination thereof. In one aspect of the adapter, the adapter essentially allows the installation of a commercially available cable tie so that the cable tie may utilize an alternate, releasable securing head through which the strap of the cable tie may be fed and secured, therefore providing a reusable attachment, if desired. The commercially available cable tie may be easily installed within the adapter which comprises a securing head much like the head of the installed cable tie, except that its grip on the cable tie strap is releasable. The adapter also includes a securing mechanism in order to assure the reliable retention of the installed cable tie. This embodiment provides a releasable and reusable equivalent alternate securing head in order that the strap of a cable tie may engage with the adapter rather than itself, providing an increase its number and its variety of uses. The adapter may therefore be used with a cable tie so that its uses may be temporary, allowing changes with regard to the materials it has gathered. This situation would be possible or even likely during a design process.

Another embodiment of the adapter may include an alternate securing head with two securing slots, each with a releasable pawl through which the strap of an installed cable tie may be fed and secured. This configuration provides a second point of connection to the adapter for the strap of the installed cable tie to be secured, thereby creating a second securing loop with a single cable tie strap, if desired.

In yet another aspect, the adapter may include a mounting hole through which a nail or screw or some other fastening device may be installed in order to secure that which is gathered by the cable tie at a desired location. In this embodiment the cable tie is used in the same manner as when it is not installed in the adapter. The adapter simply provides a method of attaching the engaged cable tie, and hence the material gathered within it, to a desired location with the use of a fastening device such as a nail or screw, for example.

Another embodiment of the adapter is much like the previous embodiment except that it allows the installation of at least two cable ties along with a mounting hole so that the goods being secured by the installed cable ties may be kept together and fastened to a desired location. In this embodiment the cable ties are used in the same manner as when they are not installed in the adapter. The adapter simply provides a method of keeping the installed cable ties together while also allowing the attachment of the cable ties, and hence the material gathered within them, to a desired location with the use of a fastening device such as a nail or screw, for example.

An additional embodiment of the adapter may include an identification plate on which relevant information may be entered so the gathered goods being held by the cable tie and adapter may be determined. In this case the adapter head may include a generally flat surface on which one may write information such as that which may be relevant to the goods that are gathered by the cable. The identification plate may be any variety of sizes and/or shapes. In this embodiment the cable tie is used in the same manner as when it is not installed in the adapter. The adapter simply provides a surface on which to enter information on an engaged cable tie without affecting its function.

DETAILED DESCRIPTION

Figure 1:
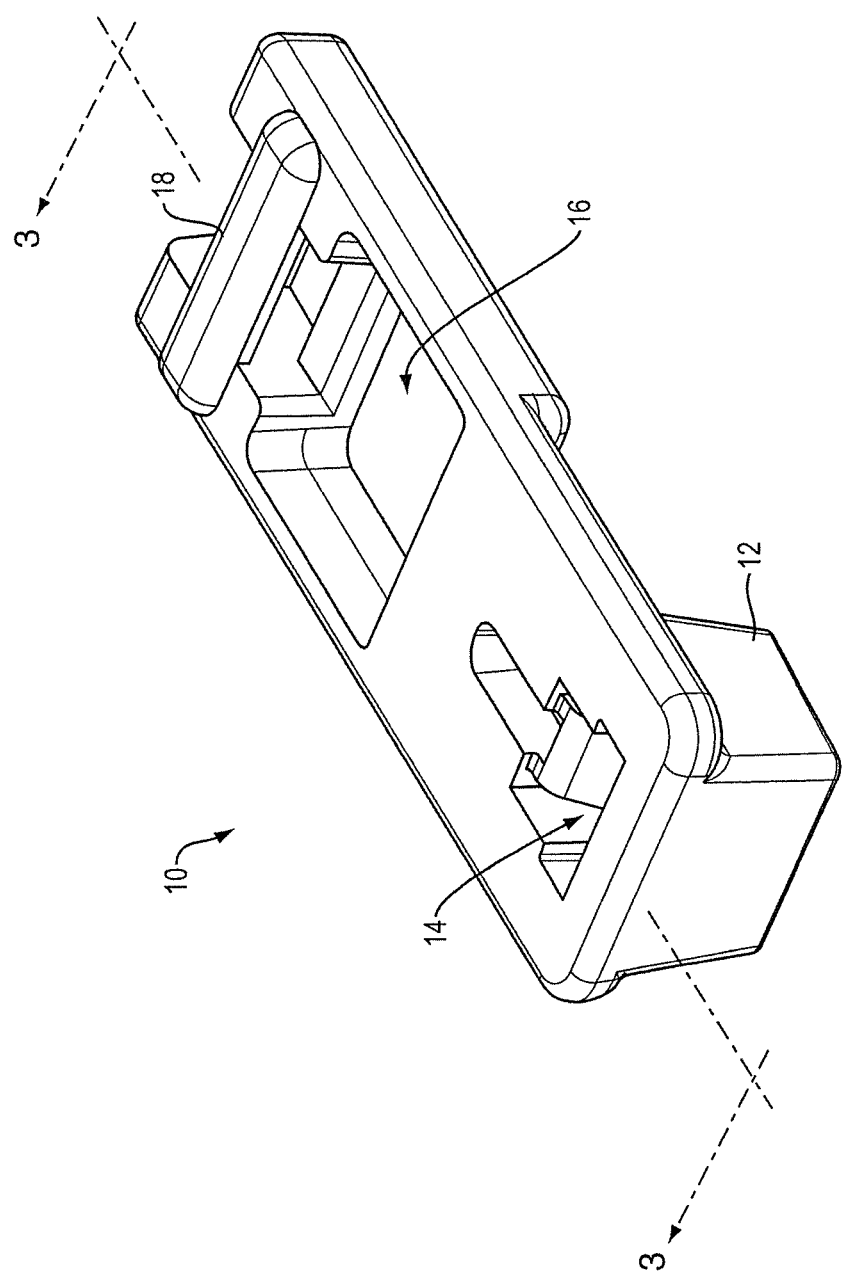
FIG. 1 is a front, bottom, side perspective view of a cable tie adapter.
Figure 2:
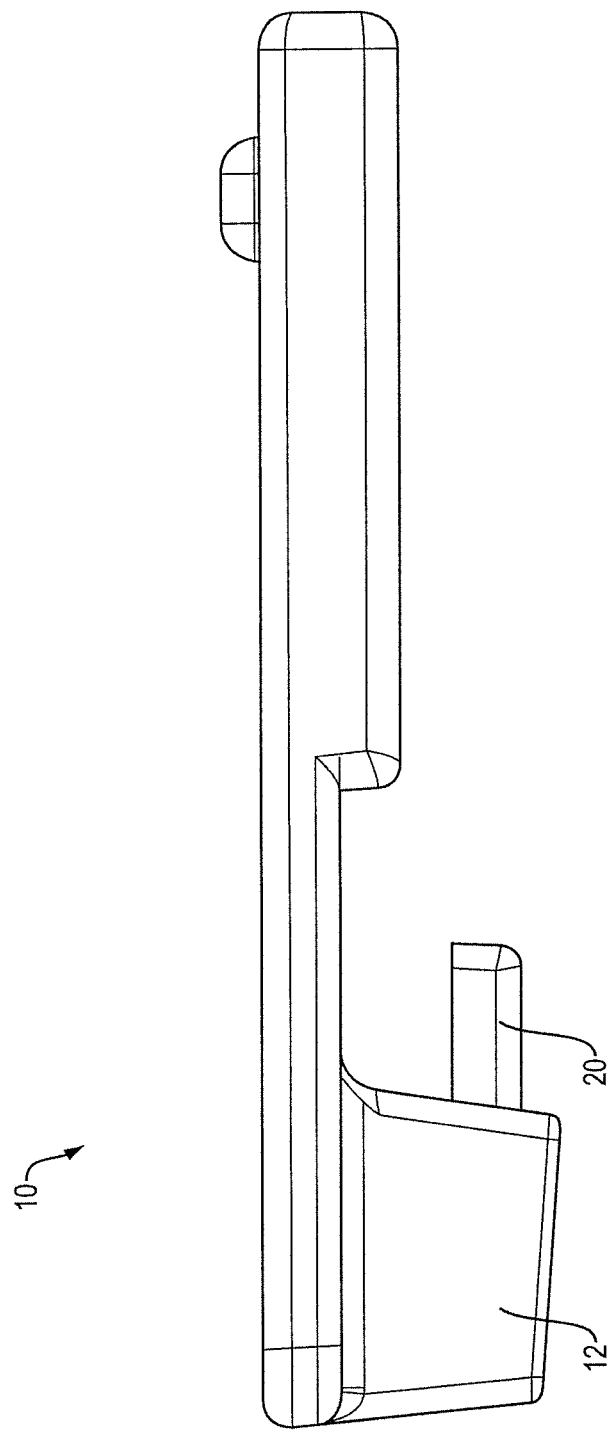
FIG. 2 is a side view of a cable tie adapter.

This disclosure relates to an adapter in which a cable tie may be installed in order to provide added and/or reusable functions. FIG. 1 illustrates the preferred embodiment of the cable tie adapter 10 which essentially provides an added or alternative securing head 12 with which one may tighten and secure materials. The front of the adapter 10 consists of a head 12 with a securing slot 14. The rear of the adapter 10 consists of a cavity 16 and a securing mechanism 18. FIG. 2 shows a side view of the preferred embodiment of the adapter 10 with head 12 and pawl release lever 20 which is employed when pushed upward toward the adapter 10.

Figure 3:
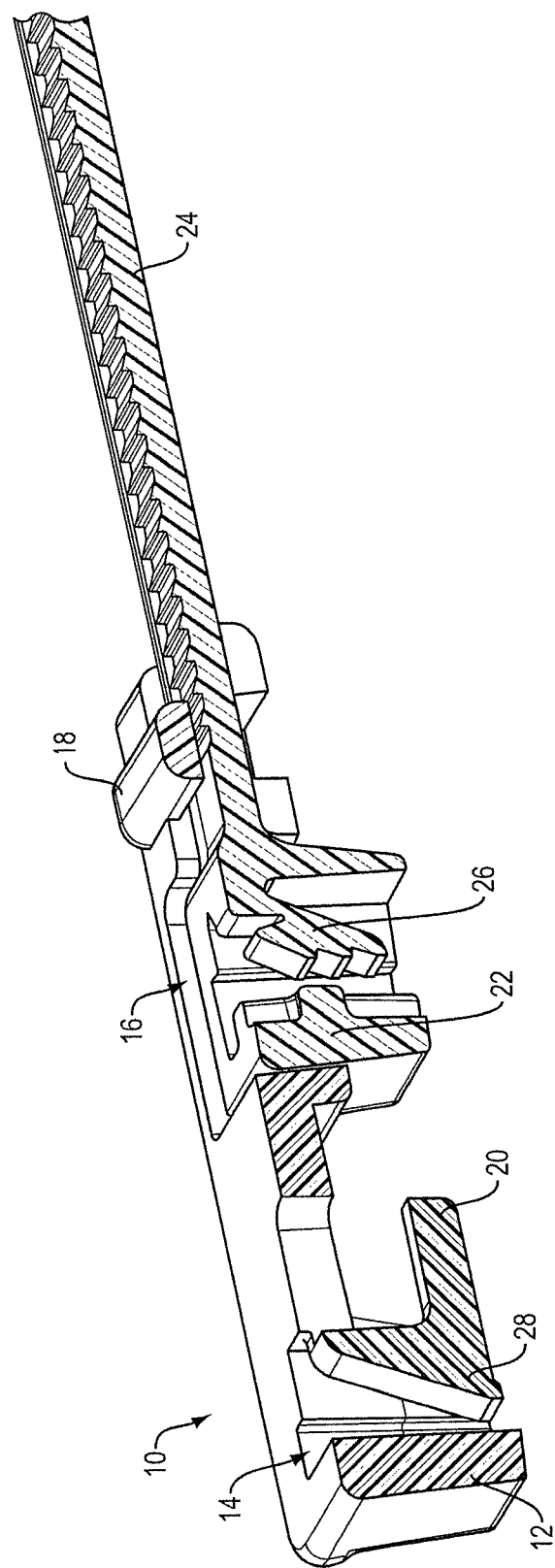
FIG. 3 is a front, bottom, side perspective view of cross-section A-A from FIG. 1 with a cross section of a cable tie installed within the adapter.

FIG. 3 depicts cross-section A-A of the length of the adapter embodiment 10 shown in FIG. 1 with a cable tie head 22 in the cavity 16 and the cable tie strap 24 fed under the securing mechanism 18 so that the head 22 remains in position within the cavity 16. This configuration of the adapter allows an existing cable tie pawl 26 to be augmented with a releasable pawl 28. Cable tie strap 24 may be fed into securing slot 14 and secured via the engagement of the releasable pawl 28 with the cable tie strap 24. The strap 24 may be disengaged and released by pushing the release lever 20 toward the body of the adapter 10, therefore separating the releasable pawl 28 from the strap 24 so that it may be withdrawn from the securing slot 14. Therefore a user may choose to permanently employ the adapter 10 in the field with its releasable pawl 28 or the adapter 10 may be used temporarily. For example, upon the proofing of a design, the adapter 10 may be removed by pulling the cable tie head 22 from the cavity 16 and the strap 24 from under the securing mechanism 18. Then the cable tie head 22 and strap 24 may be used as originally designed. This temporary use of the adapter 10 provides flexibility for the user when design changes are likely or possible, for example.

Figure 4:
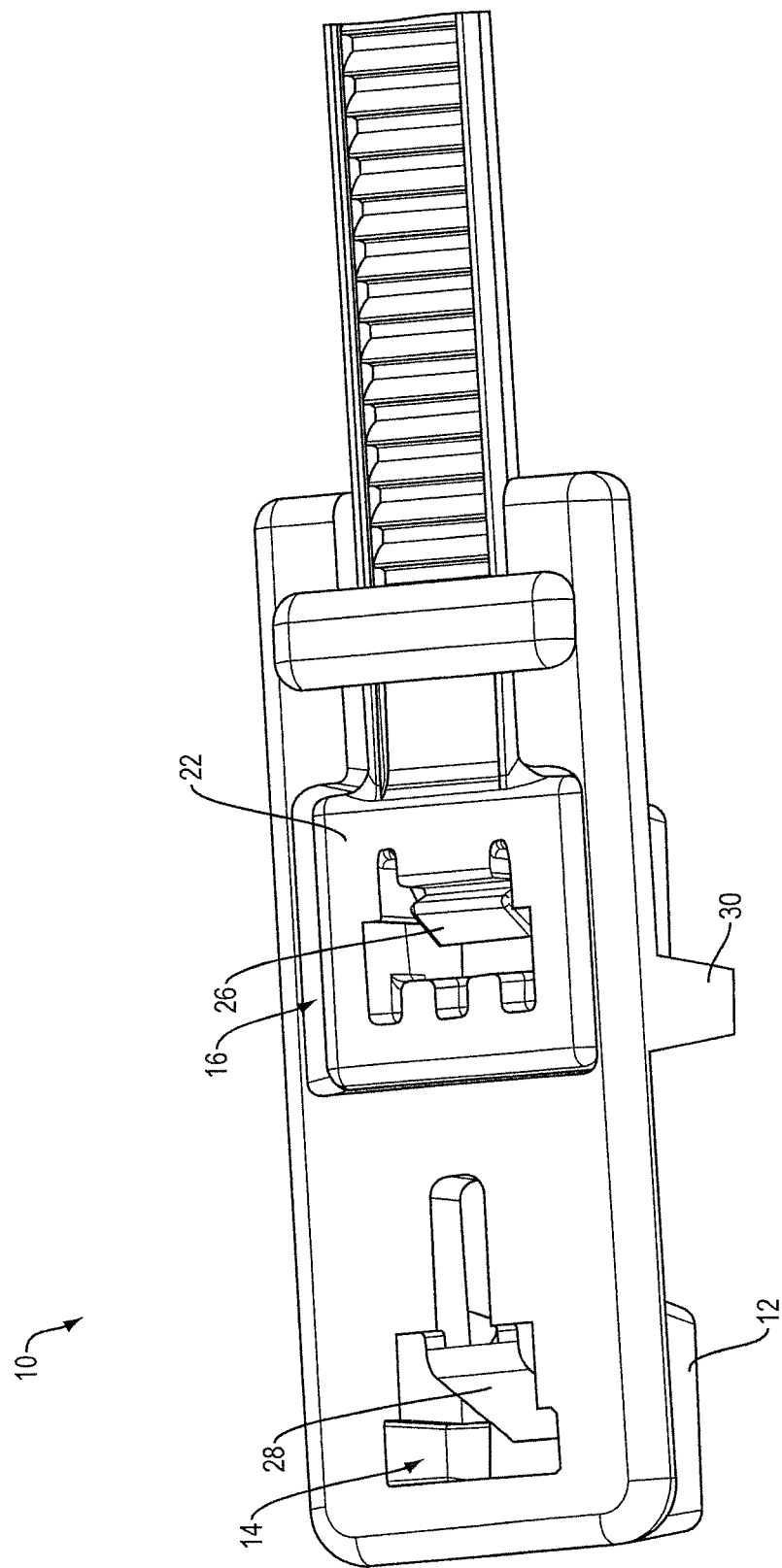
FIG. 4 is a bottom, side perspective view of an embodiment of the adapter with a cable tie installed within the adapter. The adapter cavity has an additional brace or stop against which the cable tie head may rest.
Figure 5:
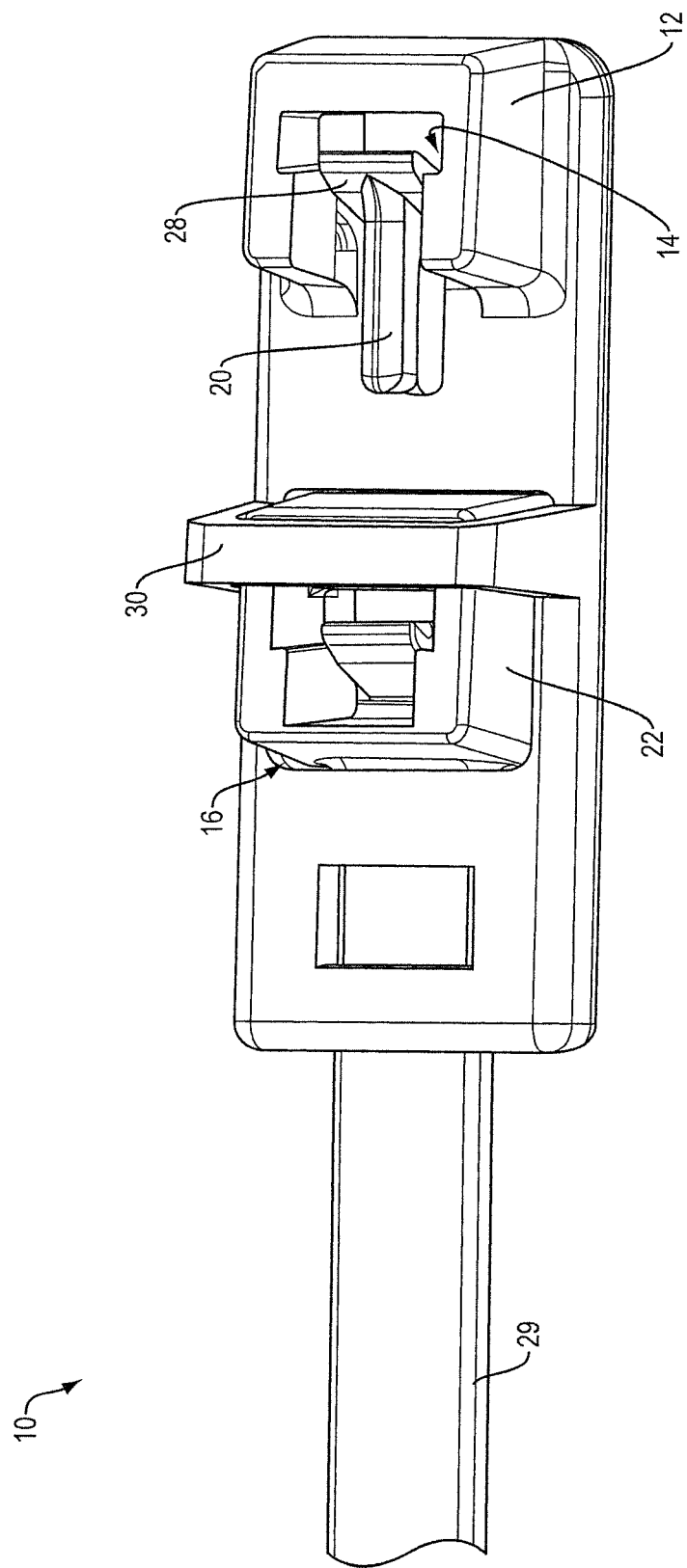
FIG. 5 is a top, side perspective view of the embodiment shown in FIG. 4. This view reveals the releasable pawl and the lever with which one may separate the releasable pawl from the strap of a cable tie.

FIG. 4 shows the top, side perspective of an embodiment of an adapter 10 with the head 12, the securing slot 14 in which the releasable pawl 28 resides, and an additional cavity bracket 30, against which the cable tie head 22 may rest in the cavity 16. FIG. 5 shows the bottom, side perspective of this embodiment with the cavity bracket 30 which supports the cable tie head 22 in the cavity 16. This view of the embodiment reveals the release lever 20 which, when pushed toward the body of the adapter 10, moves the releasable pawl 28 such that the securing slot 14 enlarges, therefore releasing a cable tie strap 29 from the securing slot in the head 12 of the adapter 10. The releasable pawl 28 within the adapter head 12 essentially functions as a replacement for the cable tie head 22 which is secured within the cavity 16 of the adapter 10.

Figure 6:
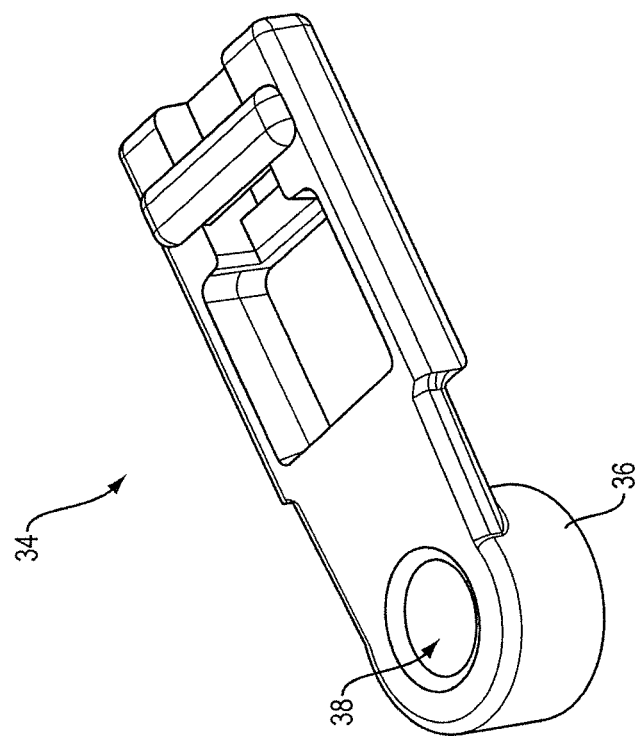
FIG. 6 is a front, bottom, side perspective view of another embodiment of the adapter with a mounting hole through which a fastening device of some sort may be inserted.
Figure 7:
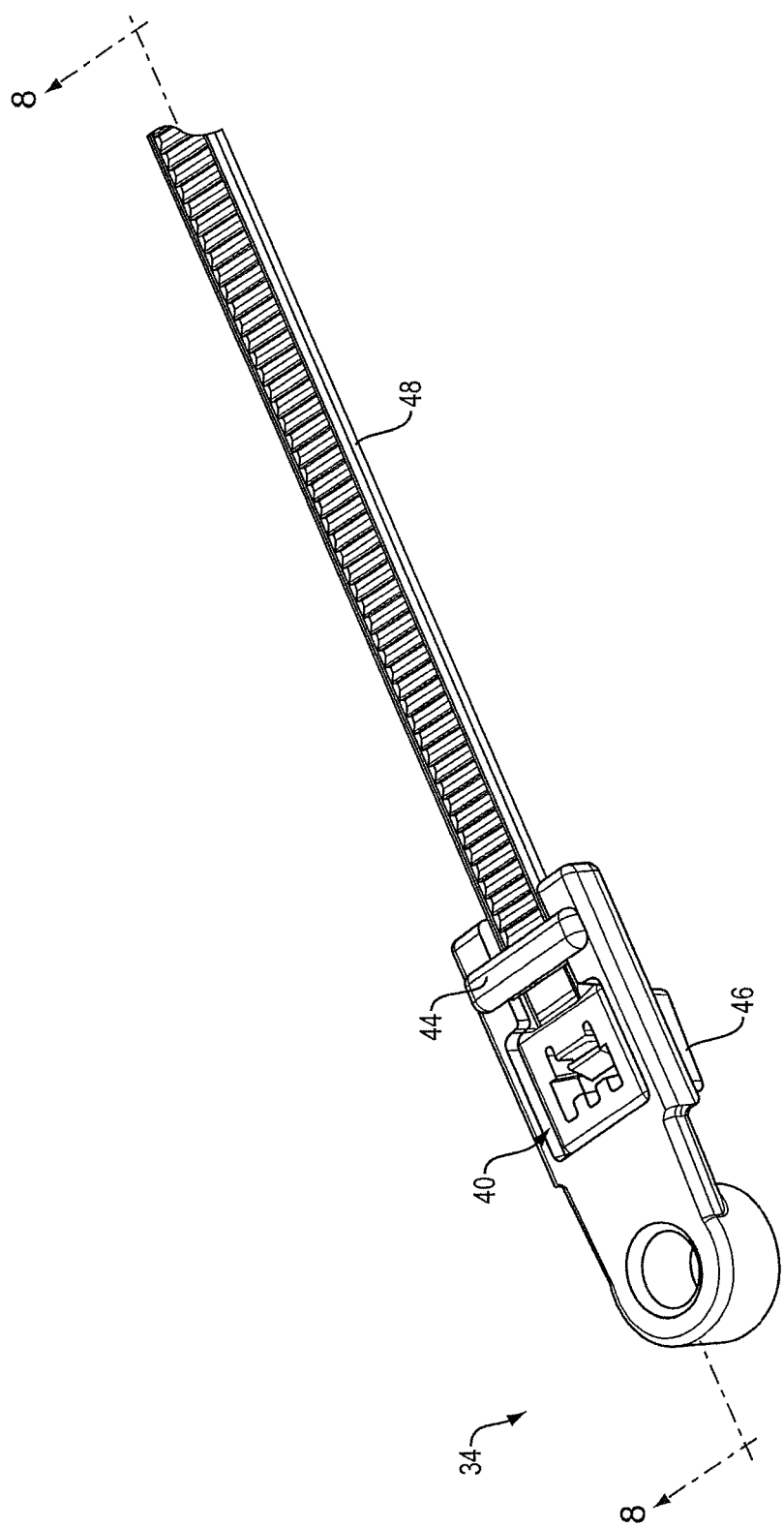
FIG. 7 is the same view as FIG. 6 with the addition of an installed cable tie.
Figure 8:
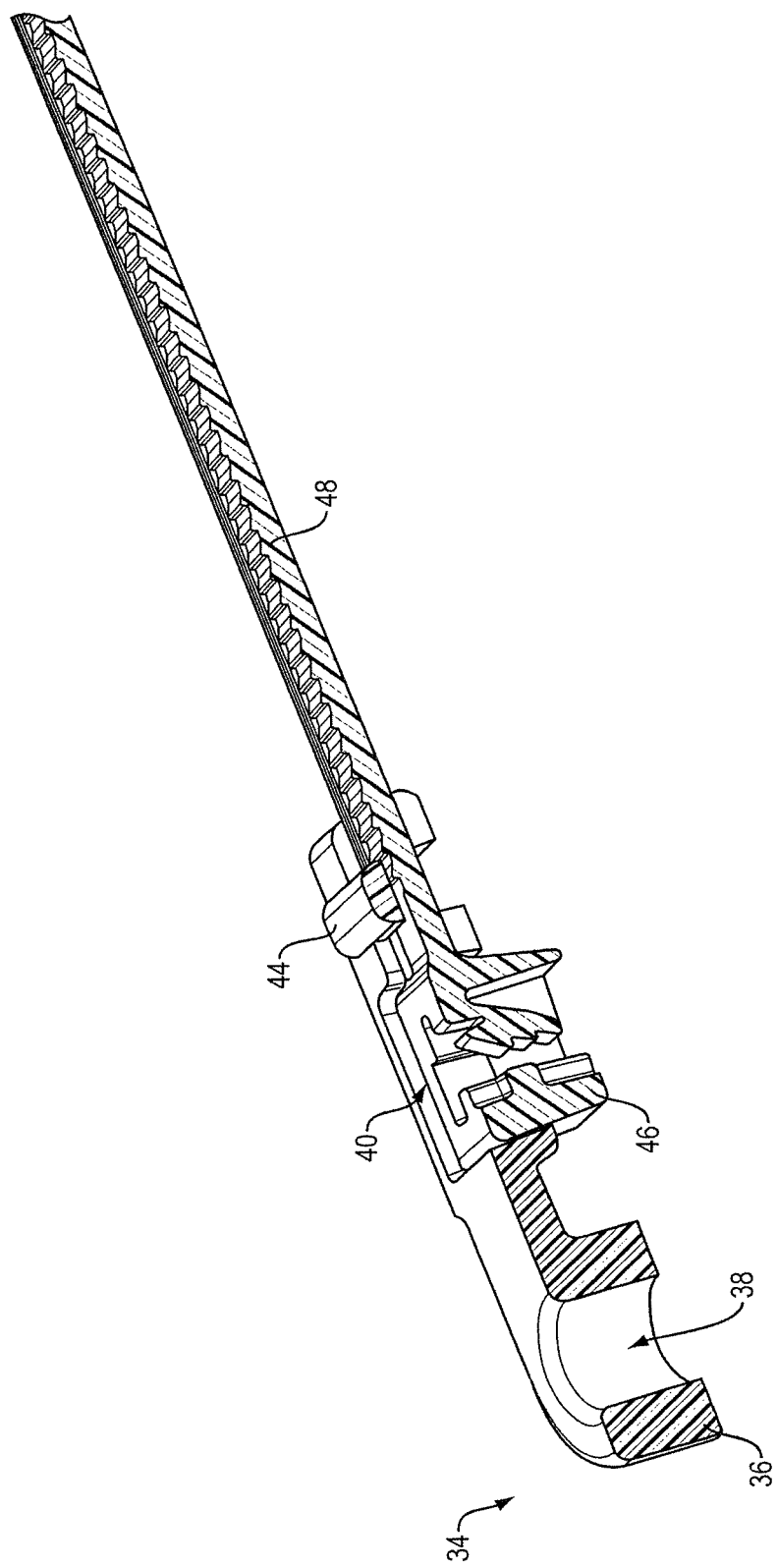
FIG. 8 is a front, bottom, side perspective view of cross-section B-B from FIG. 7 with a cross section of a mounting hole and an installed cable tie within the adapter.

FIG. 6 depicts an alternate embodiment of an adapter 34 with a head 36 and a mounting hole 38 through which some sort of fastening device may be inserted if desired. This allows the user to utilize a cable tie in its typical fashion by securely wrapping its strap around material of interest. However the adapter 34 provides the addition of a mounting hole 38 so any gathered material may be secured to a location preferred by the user. FIG. 7 depicts the adapter 34 with a cable tie head 46 and strap 48 installed within the cavity 40 and securing mechanism 44, respectively. FIG. 8 shows cross section B-B from FIG. 7, revealing the mounting hole 38 which provides an attachment point through which a user may fasten the adapter 34 to a desired location. This embodiment of the adapter 34 has the same manner of securing the cable tie head 46 and strap 48, however the adapter 34 provides a means of attaching the cable tie head 36 and strap 48 to a certain location, as selected by the user.

Figure 9:
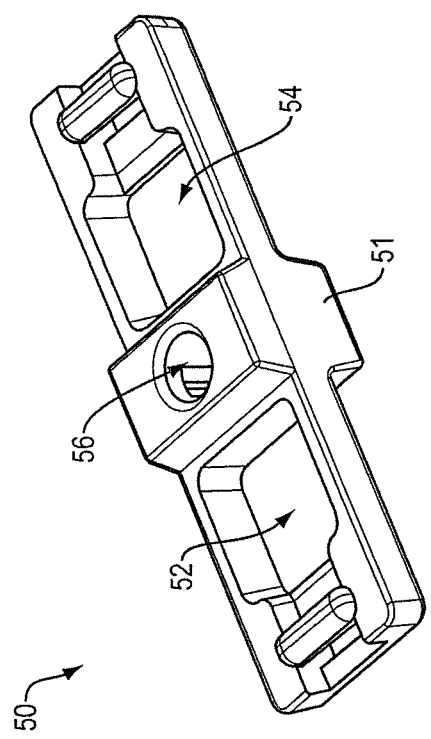
FIG. 9 is a front, bottom, side perspective view of another embodiment of the adapter with two cavities and a mounting hole through which a fastening device of some sort may be inserted.
Figure 10:
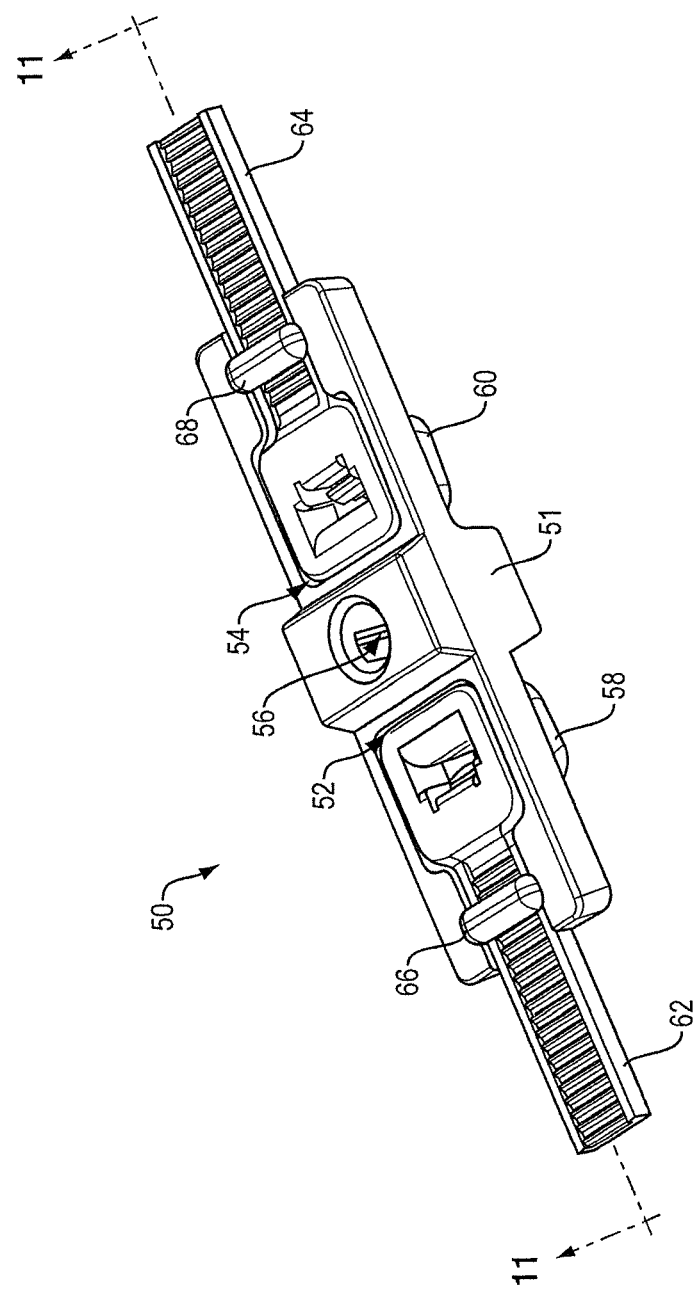
FIG. 10 is the same view as FIG. 9 with the addition of an installed cable tie.
Figure 11:
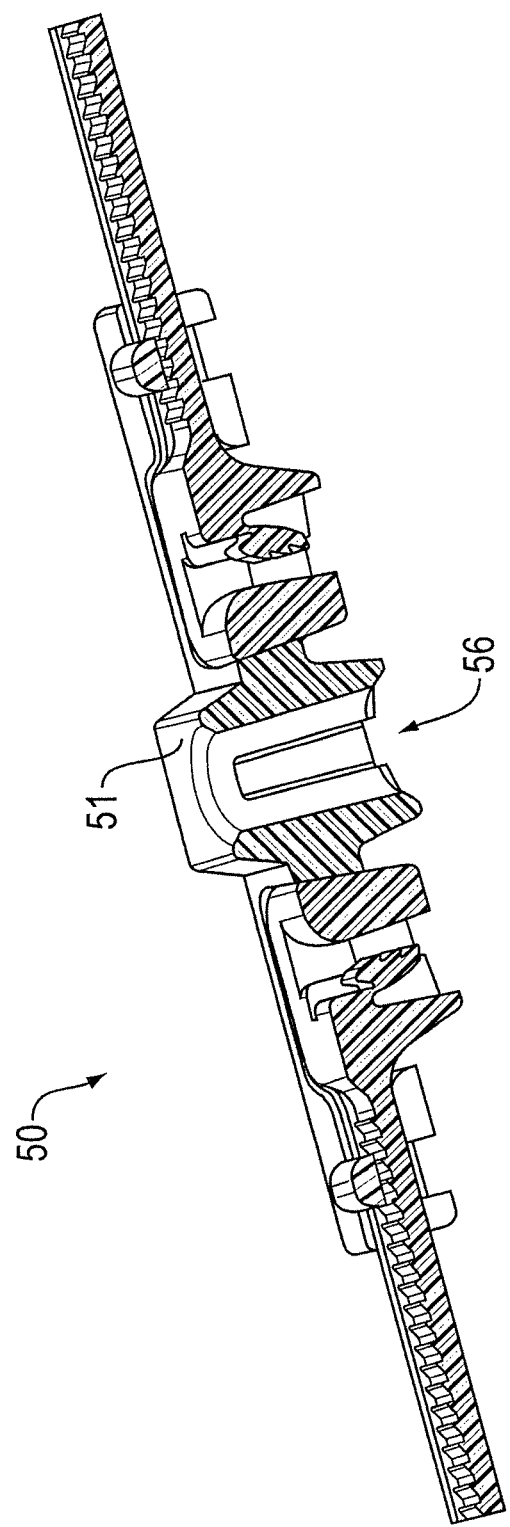
FIG. 11 is a front, bottom, side perspective view of cross-section C-C from FIG. 10 with a cross section of a mounting hole and two cable ties installed within the adapter.

FIG. 9 depicts another embodiment of the adapter 50 with a head 51, two cavities 52, 54 and a mounting hole 56. FIG. 10 shows the adapter 50 with a head 51 and two cable tie heads 58, 60 installed within the two cavities 52, 54 and two straps 62, 64 installed within the securing mechanisms 66, 68. This embodiment is similar to that which is shown in FIGS. 6-8, however it allows the user to essentially connect two groups of gathered materials, and attach them both through the mounting hole 56 to a location chosen by the user. The mounting hole 56 may be utilized with the use of a fastener of some sort, to attach the adapter 50 to a location, therefore keeping the materials gathered by the installed cable tie heads 58, 60 and straps 62, 64 together and secured to a specific selected location. FIG. 11 shows cross section C-C of the adapter 50 from FIG. 10, revealing the mounting hole 56 through the head 51 which provides the attachment point through which a user may fasten the adapter 50 to a desired location. This embodiment may be constructed and arranged to allow the installation of any number of cable ties, each requiring a means of securing a cable tie head 51 and strap 62 in each additional cavity 52 and securing mechanism 66, 68.

Figure 12:
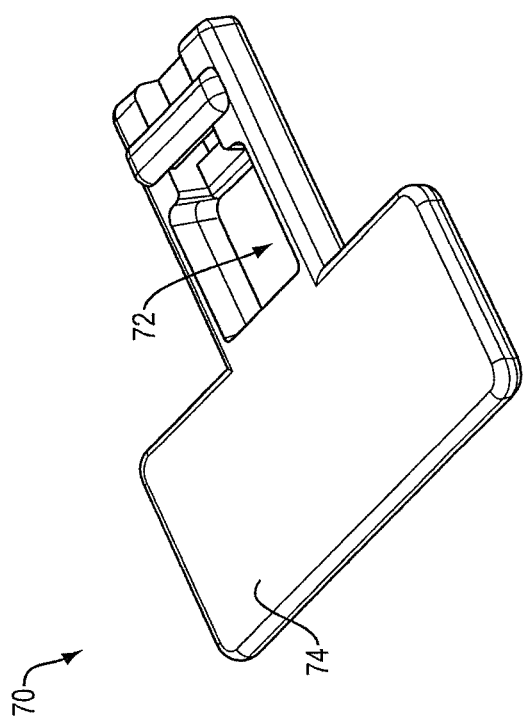
FIG. 12 is a front, bottom, side perspective view of another embodiment of the adapter with an identification plate on which one may label the adapter.
Figure 13:
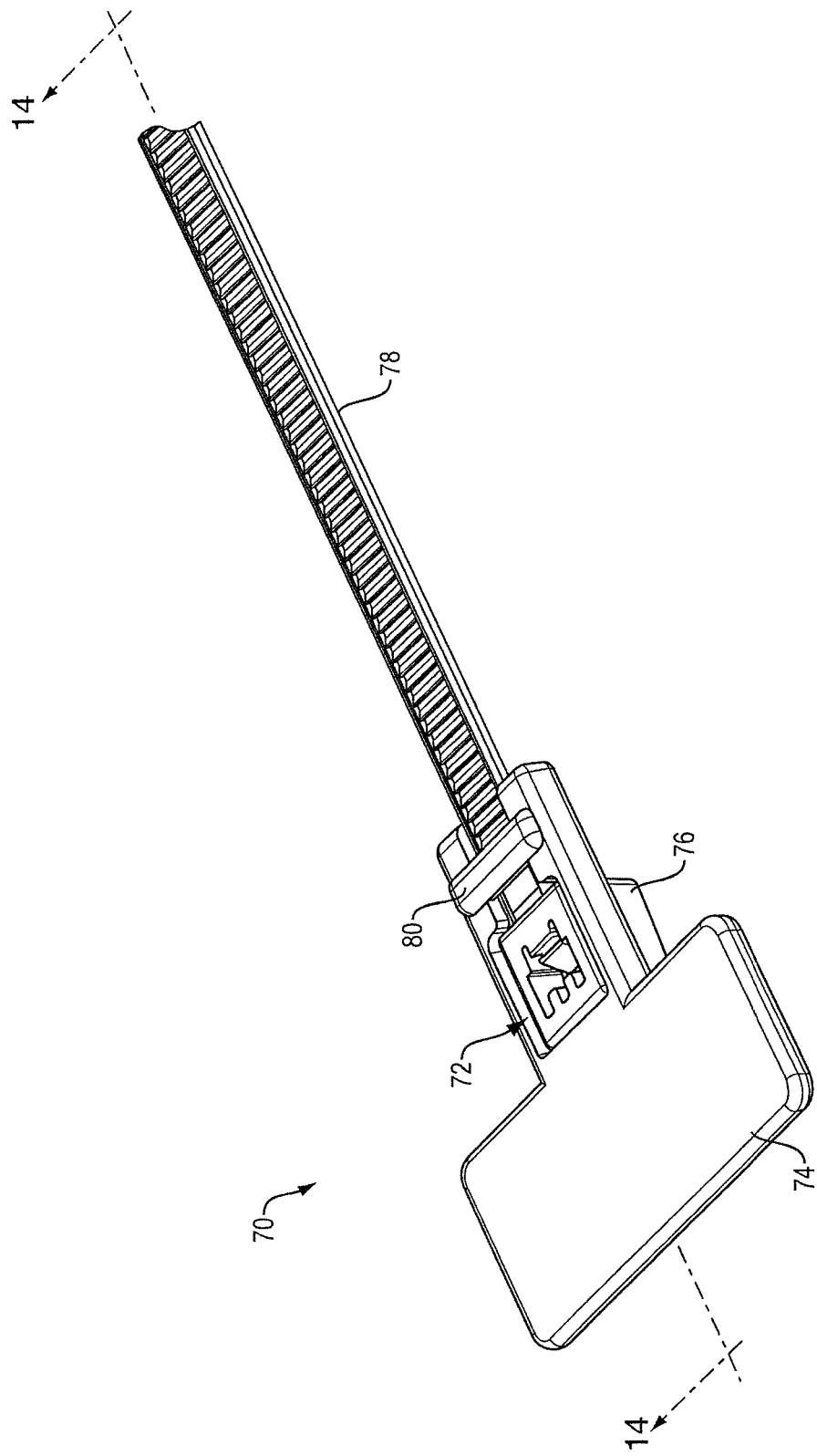
FIG. 13 is the same view as FIG. 12 with the addition of an installed cable tie.
Figure 14:
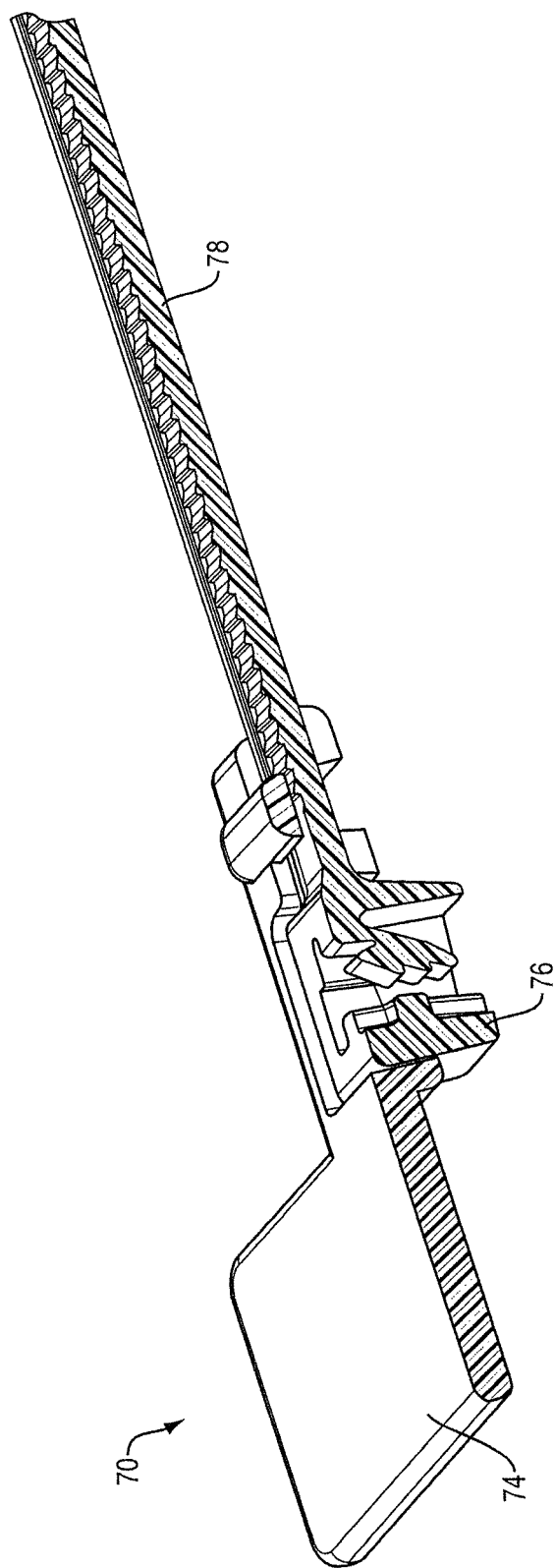
FIG. 14 is a front, bottom, side perspective view of cross-section D-D from FIG. 13 with a cross section of a cable tie installed within the adapter.

FIG. 12 depicts another embodiment of an adapter 70 with a cavity 72 and an identification plate 74 on which a user may include relevant information. This embodiment allows the user to utilize a cable tie in its typical fashion, however it provides a surface on which one may enter information such as identifying data regarding the gathered contents, while not affecting the function of the cable tie. FIG. 13 depicts the adapter 70 with a cable tie head 76 and strap 78 installed within the cavity 72 and securing mechanism 80, respectively. FIG. 14 shows cross section D-D of adapter 70 from FIG. 13, revealing the nature of the connection between the identification plate 74 when a cable tie head 76 and strap 78 are installed.

A number of implementations have been described. Nevertheless, it will be understood that additional modifications may be made without departing from the scope of the inventive concepts described herein, and, accordingly, other embodiments are within the scope of the following claims.

What is claimed is:

1. A unitary molded plastic one-piece cable tie adapter, comprising:
   unitary front and rear portions that are parts of a single structure:
   a front, and an opposing rear edge:
   an upper surface that is contiguous from the front to the rear edge: wherein the front portion comprises: a front portion bottom;
   a securing slot that extends from the contiguous upper surface to the front portion bottom; and a movable pawl in the securing slot; and
   wherein the rear portion comprises:
   a rear portion bottom;
   a cavity that is spaced from the securing slot and that is open to the contiguous upper surface;
   an elongated slot extending from the cavity to the rear edge, the elongated slot having an open top that is open to the contiguous surface; and a fixed securing mechanism located on the contiguous upper surface and extending across part of the elongated slot, to partially cover the open top of the elongated slot; and
   wherein the adapter is configured such that a cable tie with a head and a strap can be installed in the adapter by placement of the cable tie head in the rear portion cavity with the cable tie strap extending through the entire length of the elongated slot in the rear portion and extending through the securing slot and engaged with the movable pawl in the front portion.

2. The cable tie adapter of claim 1 wherein the movable pawl comprises an integral, extending lever that is configured to be moved by exerting a pushing force against it, to thereby move the movable pawl between a closed position in which the movable pawl at least partially obstructs the securing slot and an open position wherein the movable pawl obstructs the securing slot to a lesser degree than in the closed position, so that an engaged cable tie can be released from the pawl and removed from the securing slot.

3. The cable tie adapter of claim 1 wherein the cavity comprises a tapered hole from the top to the rear portion bottom, allowing access to the installed cable tie within the cavity.

4. The cable tie adapter of claim 3 further comprising a bracket that extends from the rear portion bottom and below the cavity to further support the installed cable tie within the cavity.

5. A unitary molded plastic one-piece cable tie adapter comprising:
   unitary front and rear portions that are parts of a single structure;
   a front, and an opposing rear edge:
   an upper surface that is contiguous from the front to the rear edge; wherein the front portion comprises: a front portion bottom;
   a securing slot that extends from the contiguous upper surface to the front portion bottom; and
   a movable pawl in the securing slot with an integral, extending lever that is adapted to be moved, to move the movable pawl between a closed position in which the movable pawl at least partially obstructs the securing slot and an open position wherein the movable pawl obstructs the securing slot to a lesser degree than in the closed position; and
   wherein the rear portion comprises:
   a rear portion bottom;
   a tapered hole from the contiguous upper surface to the rear portion bottom that is spaced from the securing slot and that is open to the contiguous upper surface, allowing access to an installed device within the tapered hole;
   an elongated slot extending from the tapered hole to the rear edge, the elongated slot having an open top that is open to the contiguous upper surface; and
   a fixed securing mechanism located on the contiguous upper surface and extending across part of the elongated slot, to partially cover the open top of the elongated slot; and
   wherein the adapter is configured such that a cable tie with a head and a strap can be engaged with the adapter by placement of the cable tie head in the rear portion cavity with the cable tie strap extending through the entire length of the elongated slot.

6. The cable tie adapter of claim 5 further comprising a bracket that extends from the rear portion bottom and below the tapered hole to further support the installed cable tie within the cavity.

* * * * *